April 26, 1960   G. C. RANDOLPH ET AL   2,934,274
VOLTAGE RATIO DEVICE
Filed July 31, 1957   3 Sheets-Sheet 1

Inventors
GERALD C. RANDOLPH
GEORGE R. POLEN
By Philip M. Bolton
Attorney

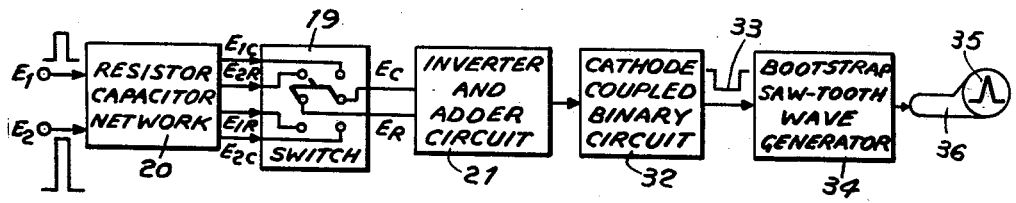
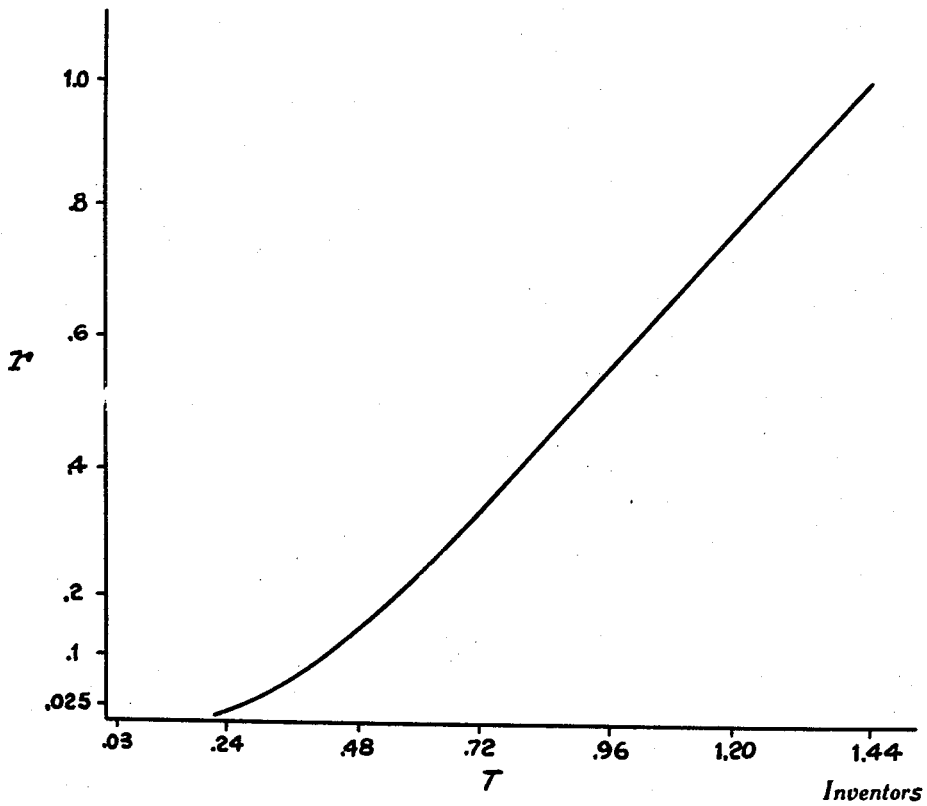

Inventors
GERALD C. RANDOLPH
GEORGE R. POLEN
By Philip M. Bolton
Attorney

# United States Patent Office 2,934,274
Patented Apr. 26, 1960

2,934,274

VOLTAGE RATIO DEVICE

Gerald C. Randolph, New York, N.Y., and George R. Polen, Clifton, N.J., assignors to International Telephone and Telegraph Corporation, Nutley, N.J., a corporation of Maryland Application July 31, 1957, Serial No. 675,496

9 Claims. (Cl. 235—196)

The present invention relates to a system for measuring the ratio between two voltages, and, in particular, to a system for measuring this ratio as a function of time.

In various systems, such as computers or photoelectric color analyzers, it is often necessary to measure the ratio between two voltages of interest. To accomplish this, many well-known systems have been developed.

In these prior art systems, to accomplish these measurements, very frequently each of the potentials is measured separately and from these separate measurements, by a computing device, the ratio is computed. This procedure is undesirable in two aspects. First, the overall determination of the ratio involves two major steps including the computation which gives rise to an additional possibility of error, when compared to a determination without a computation and secondly, the requisite of two major steps is time consuming and hence, undesirable in a system wherein time is of the essence. There have been further developments in the prior art whereby the ratio between two voltages has been measured as a function of time. The usual pattern of such devices involves charging a condenser and measuring its discharge time in comparison with one of the input signals; or charging two condensers, one condenser with each of said input signals and discharging at different predetermined rates until such time as the voltage values across the condensers are equal. The elapsed time necessary to have the voltages be equal is indicative of the ratio. The latter type of system has been disclosed in a pending application by Laurin G. Fischer for a "Voltage Ratio Indicator," application No. 500,894, filed April 12, 1955. Although these latter systems have improved the ratio measuring technique, especially in systems where time is essential, these latter systems are characterized by a limitation when the user wants to measure the ratio between two voltage pulses in a short enough period of time to be able to use these pulses in a further operation. If the pulses are of a short duration, the prime requisite of charging up and discharging to measure the ratio, as found in the improved systems, still cuts short the time left to use the pulses being measured for a further operation. It follows that a system whereby the user might measure the ratio between two voltage pulses without a computation in a short enough period of time to use these pulses in another operation would be desirable.

An object of the present invention is the provision of an improved system for indicating the ratio between voltages.

Another object of the present invention is the provision of a system for measuring the ratio between two voltage pulses in a short enough period of time to allow a further use of the measured voltage pulses in further operations.

Another object of the present invention is the provision of a system which enables the user to employ a selection of circuitry depending on whether or not the ratio between two voltages to be determined, is more or less than unity.

In accordance with a main feature of the present invention, a separate impedance device and a separate storage device are coupled in series with each voltage source and, as the storage devices are being charged, a comparison is made between the voltage across one impedance device associated with one of said sources and the voltage across the storage device associated with another of said sources.

In accordance with another feature of the present invention there is a means provided to measure the time elapsed from the initiation of the charging operation, as described in connection with the feature above, and the time when the compared voltages reach a predetermined ratio.

Other and further objects of the present invention will become apparent and the foregoing will be better understood with reference to the following description of the embodiments thereof, references being had to the drawings in which:

Fig. 2 is a schematic and block diagram showing a ratio indicator system employing the present invention; and Fig. 3 is a graph showing the relationship between $r$ and T;

In a preferred embodiment carrying out the present invention, the voltages whose ratio is to be determined are each respectively coupled to an associated resistor-capacitor series circuit. These voltages represent the charging means for their associated capacitors. There is connected to the resistor of one circuit and to the capacitor of the other circuit a voltage comparison means. Both of the circuits are subjected to their respective input voltages simultaneously, and, therefore, the charge-up operation for the respective capacitors is initiated simultaneously. The voltage comparison means will experience or sense an exponential decrease in voltage across the resistor to which it is connected and an exponential increase in voltage across the capacitor to which it is connected. The time elapsed between the initiation of the charging up and the time at which these two exponentially varying voltages are equal will represent the ratio between the two input voltages. A means for sensing this elapsed time, calibrated in terms of voltage ratio, is provided for the user. Further, a comparison means is provided to measure the exponential varying voltage across the remaining resistor and capacitor. Either the comparison means used in connection with the operation described above or the comparison means used in connection with the operation described herewith can be used to advantage depending on whether or not the maximum ratio between the two voltages exceeds unity or not. The present invention provides means for selecting the proper comparison means to obtain the optimum system.

Figure 1A:
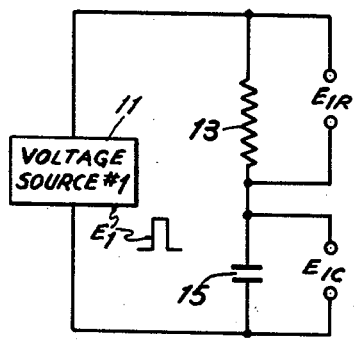
Figs. 1a through 1f are in part a schematic and graphic display showing the relationship of the exponentially varying voltages across each of the condensers in combination with each of the resistors.
Figure 1B:
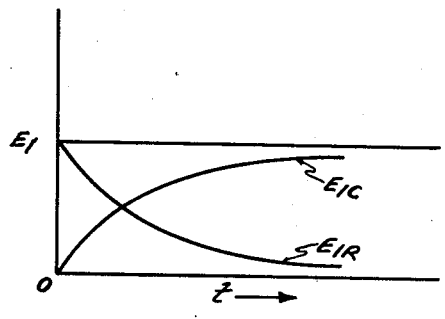
Figure 1C:
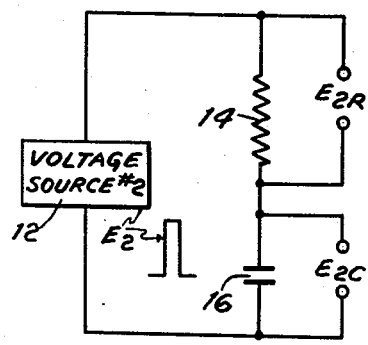
Figure 1D:
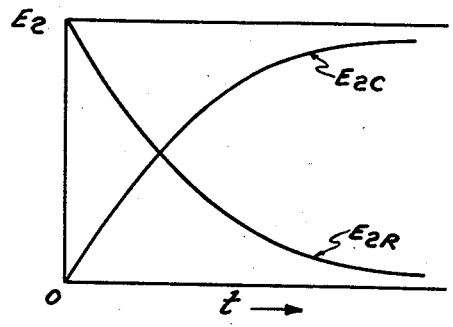
Figure 1E:
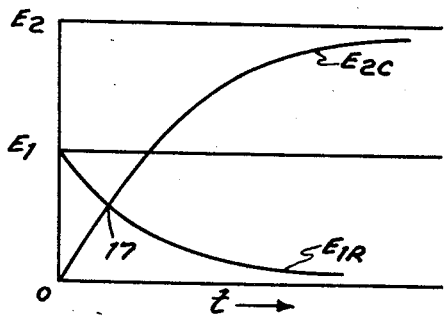
Figure 1F:
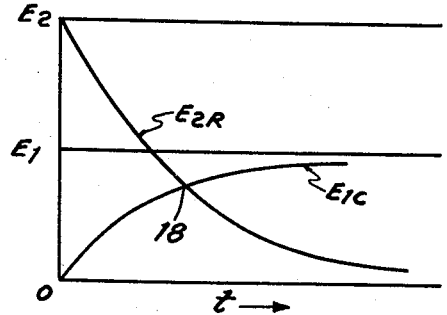

Referring now to the figures, there is shown in Fig. 1A a schematic of a simple circuit employing a resistor-capacitor series circuit across a voltage source 11. Fig. 1C shows a similar resistor-capacitor circuit connected across a voltage source 12. In the circuits of Figs. 1A and 1C the resistors 13 and 14 are of equal value, as are the capacitors 15 and 16. Fig. 1B shows the exponential increase of the voltage $E_{1C}$ across 15 while showing the exponential decrease of the voltage $E_{1R}$ across 13. Fig. 1D shows the exponential decrease of voltage $E_{2R}$ across the resistor 14 as the voltage $E_{2C}$ increases exponentially as shown across the capacitor 16. Plotting portions of the graphs of Figs. 1B and 1D on the Fig. 1E, there is shown the exponential decrease of voltage $E_{1R}$ compared with the exponential increase of voltage $E_{2C}$. Similarly, in Fig. 1F there is shown the exponential decrease of the voltage $E_{2R}$ compared with the exponential increase of voltage $E_{1C}$. It will be noted that in Fig. 1E the voltages across, respectively, the resistor 13 and the capacitor 16 reach an equal value at point 17 and, likewise, the voltage values of Fig. 1F reach an equal value at point 18. It will be noted that the abscissa values of the graphs are in "time" and that accordingly in Fig. 1E it has taken less time for the voltages represented to reach an equal value than it took for the voltages represented on the graph of Fig. 1F to reach an equal value. It follows that it would behoove the user of this system to predetermine which combination to use to make it possible to acquire the ratio in the shortest period of time. The invention provides the switching device 19, which can be a manually or automatically operated switch or relay for properly selecting the combination when using the device.

Consider two identical resistor-capacitor networks as shown in Fig. 1 being excited by pulses E1 and E2. The instantaneous voltage on each of the capacitors is $$E_{1C} = E_1 - E_1 e^{\frac{-t}{T}} \quad (1)$$

$$E_{2C} = E_2 - E_2' e^{\frac{-t}{T}}$$

where $$T = RC \quad (2)$$

and the instantaneous voltage on the resistors is:

$$E_{1R} = E e^{\frac{-t}{T}}$$

$$E_{2R} = E e^{\frac{-t}{T}}$$

Since the capacitor voltages approach the applied voltages asymptotically, and the resistor voltages approach zero asymptotically, there must exist a time when $E_{2R}$ equals $E_{1C}$, and a time when $E_{1R}$ equals $E_{2C}$ when $$E_{2R} = E_{1C} \quad (3)$$

$$E_2 e^{\frac{-t}{T_1}} = E_1 - E_1 e^{\frac{-t}{T_1}} \quad (4)$$

but $$T_1 = T_2 = T \text{ since } R_1 C_1 = R_2 C_2 \quad (5)$$

therefore $$E_1 = (E_1 + E_2) e^{\frac{-t}{T}} \quad (6)$$

rearranging $$e^{\frac{-t}{T}} = \frac{E_1}{E_1 + E_2} \quad (7)$$

substituting $$r = E_1/E_2 \quad (8)$$

and taking the log of both sides $$t = -T \ln \frac{r}{1+r} \quad (9)$$

similarly, when $$E_{1R} = E_{2C} \quad (10)$$

$$E_1 e^{\frac{-t}{T}} = E_2 - E_2 e^{\frac{-t}{T}} \quad (11)$$

$$E_2 = (E_1 + E_2) e^{\frac{-t}{T}} \quad (12)$$

$$e^{\frac{-t}{T}} = \frac{E_2}{E_1 + E_2} \quad (13)$$

$$t = -T \ln \frac{1}{r+1} \quad (14)$$

Essentially, the above mathematical derivation demonstrates that $t$ is dependent primarily on $r$, i.e. on the ratio $E_1/E_2$. Therefore, $t$ can be taken as a measure of the voltage ratio $E_1/E_2$.

Fig. 3 shows the relationship between the ratio $r$ and units of the time constant T. It can be seen from the figure in the Equations 9 and 14 that if the ratio has a maximum time required to acquire the ratio of unity or pass through a ratio range 1:100, will be 1.45$t$ for the 1R—2C combination and 100T for the 2R—1C combination. If the ratio has a minimum value of unity, the converse will hold. Since T may be a small fraction of the pulse duration, it is possible to have the ratio determined and yet have ample time left to perform operations necessary while the ratio determining pulses still exist.

Fig. 2 shows a block diagram of a system using the invention. Two pulses, $E_1$ and $E_2$ are passed to the resistor-capacitor network 20. Voltages $E_{1R}$, $E_{1C}$, $E_{2R}$ and $E_{2C}$ are tapped off by means shown in Figs. 1A and 1C and passed to the switching device 19. It is apparent from the graph 1e and Equation 14 above, that if the ratio is to be less than unity, that the $E_{1R}$—$E_{2C}$ combination should be used and, as stated above, if the ratio is greater than unity, the $E_{2R}$—$E_{1C}$ combination should be used. The switching device 19 permits this selection. Switching device 19 can be a manual or automatic switch such as a double pole, double throw relay. The user will set switch 19 to either a "more or less than unity" setting. Having selected the proper combination, the $E_C$ and $E_R$ signals are passed to the inverter and adder device 21. At 21 one of the pulses, for instance $E_C$, is inverted, and the signals are passed to an adding device.

Figure 4A:
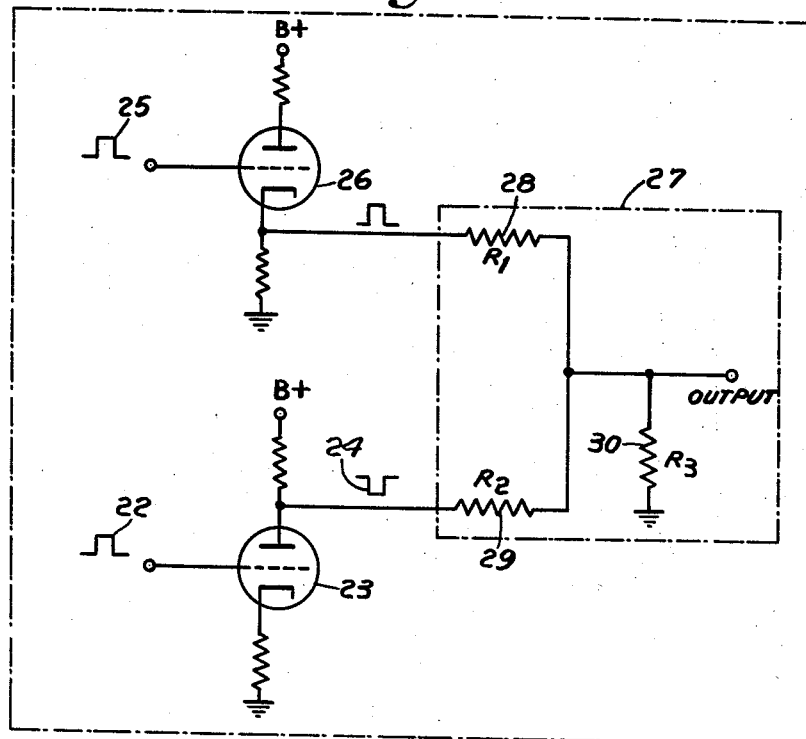
Figs. 4a and 4b are respectively a circuit diagram and a graph showing an inverter and adder circuit and a graph representing the output therefrom.
Figure 4B:
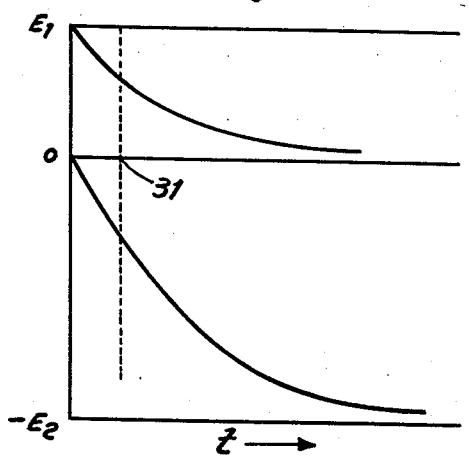

This inverter and adder operation can be accomplished by the circuitry of Fig. 4A by applying the pulse 22 to be inverted to a triode 23 and taking the inverted pulse 24 from the anode thereof; simultaneously passing the other pulse 25 which is to be added to the inverted pulse 24, to a cathode follower circuit 26 in order to equate the second pulse to the time delay inherent in the inverting operation; passing both pulses to a resistor adding network 27, wherein two resistors 28 and 29 are terminated in a third resistor 30 and obtaining the voltage summation from the voltage across this third resistor. This circuitry is shown in Fig. 4A. By way of illustration, if the proper combination was $E_{1R}$ and $E_{2C}$ then the voltage would appear in the adder device as shown on Fig. 4B. It is clear from the graph of Fig. 4B that the voltage summation at time 31 would be zero and during the time prior to 31 the summation would be positive. This positive summation voltage applied to the cathode coupled binary circuit, or Schmitt trigger 32 will cause an output therefrom as shown at 33. The pulse output of the circuit 21 is characterized by a steep rise and an exponential fall. This pulse is converted by the Schmitt circuit into a rectangular pulse 33, whose width is dependent on the ratio $E_1/E_2$. The leading edge of pulse 33 is produced by the leading edge of the pulse above derived from circuit 21, and the trailing edge of pulse 33 occurs when the exponential fall of the previous pulse has substantially dropped to zero. Circuit 32 is described in the text "Pulse and Digital Circuits," by Millman and Taub, published by McGraw-Hill, 1956. This square pulse will control the bootstrap saw-tooth-wave generator 34, which will give an indication as shown at 35 on the cathode ray tube 36. The generator circuit 34 is described in Terman's fourth edition of "Electronic and Radio Engineering," McGraw-Hill, 1955. The graduations on the face of 36 can be vertically in ratio units to give a direct reading of the ratio between the voltages applied. The embodiment of Fig. 2 is merely illustrative of the use of the invention. Obviously, the voltage source could be compared to get the null point described in connection with Fig. 4B, and can be used to control such devices as servos, analog systems and other types of indicating apparatus.

While we have described above the principles of our invention in connection with specific apparatus, it is to be clearly understood that this description is made only by way of example and not as a limitation to the scope of my invention as set forth in the objects thereof and in the accompanying claims.

We claim:

1. A system for determining the voltage ratio between signals comprising a plurality of storage devices, a plurality of impedance devices, a plurality of voltage input sources each being respectively coupled in series with a separate one of said impedance devices and a separate one of said storage devices to charge its associated storage device through its associated impedance, means coupled to said devices during the charging of said storage devices to compare simultaneously the instantaneous voltage across the storage device associated with one of said input sources and across the impedance device associated with another of said input sources to determine the voltage ratio.

2. A system for determining the voltage ratio between signals comprising a plurality of storage devices, a plurality of impedance devices, a plurality of voltage input sources each being respectively coupled in series with a separate one of said impedance devices and a separate one of said storage devices to charge its associated storage device through its associated impedance device, means coupled to said devices to compare simultaneously during the charging of said storage devices the instantaneous voltage across the storage device associated with one of said voltage input sources and across the impedance device associated with another of said voltage input sources, and time measuring means coupled to said comparison means to measure the elapsed time from whence said charging operation is initiated until said compared voltages reach a predetermined ratio.

3. A system for determining the voltage ratio between signals according to claim 2, wherein said comparison means includes a signal inversion means coupled to one of said devices whose voltage condition is being compared to invert the polarity of the voltage sensed thereat, voltage addition means to add said inverted voltage signal to the voltage signals sensed across said other device whose voltage condition is being compared, and means coupled to said addition means responsive to a predetermined voltage summation to pass a signal to said time measuring means.

4. A system for determining the voltage ratio between signals according to claim 3, wherein said time measuring means includes a bootstrap saw-toothed waveform generator coupled to a cathode ray tube device to graphically picture said voltage ratio.

5. A system for determining the voltage ratio between pulses comprising a first and second resistor-capacitor series circuit, a first and second pulse source coupled respectively to said first and second resistor-capacitor circuits to respectively charge their associated capacitors, first means coupled to said resistor-capacitor elements during the charging of said storage capacitors to compare simultaneously the voltage across said first resistor with the voltage across said second capacitor to determine the voltage ratio between said pulses.

6. A system for determining the voltage ratio between pulses comprising first and second resistor-capacitor series circuits, first and second pulse sources coupled, respectively, to said first and second resistor-capacitor circuits to respectively charge their associated capacitors, comparison means coupled to said resistor-capacitor elements during the charging of said capacitors to compare simultaneously the voltage across said first resistor with the voltage across said second capacitor, and time measuring means coupled to said comparison means to measure the elapsed time from whence said charging operation is initiated until said compared voltages reach a predetermined ratio.

7. A system for determining the voltage ratio between pulses according to claim 6, further including second means to compare simultaneously the voltage across said second resistor with the voltage across said first capacitor to determine the voltage ratio between said pulses.

8. A system for determining the voltage ratio between pulses according to claim 7, further including a switching means coupled to said resistor-capacitor elements to enable the selection between said first resistor-second capacitor combination and said second resistor-first capacitor combination to determine the ratio between said pulses in the least amount of time.

9. A system for determining the voltage ratio between pulses according to claim 6, wherein said comparison means includes a pulse inverting device to invert the polarity of the pulse sensed across said second capacitor, a voltage adding means coupled to said inverter device and said first resistor to add said inverted pulse and the pulse sensed across said first resistor to obtain a pulse summation output thereof, a cathode coupled binary circuit coupled to said adding means to produce a pulse of constant amplitude for a period commensurate with said pulse summation output, and a bootstrap saw-tooth-wave generator coupled to said binary circuit to give a pulse output whose amplitude is representative of the ratio between said first and second pulses.

References Cited in the file of this patent

UNITED STATES PATENTS

| | | |
|---|---|---|
| 2,180,659 | Bahring | Nov. 21, 1939 |
| 2,422,240 | Jackes | June 17, 1947 |
| 2,647,236 | Saunderson et al. | July 28, 1953 |
| 2,652,194 | Hirsch | Sept. 15, 1953 |